March 12, 1957  L. Q. HINES, SR., ET AL  2,784,881
APPARATUS FOR DISTRIBUTING FERTILIZER, LIME AND LIKE MATERIALS
Filed May 1, 1953  4 Sheets-Sheet 3
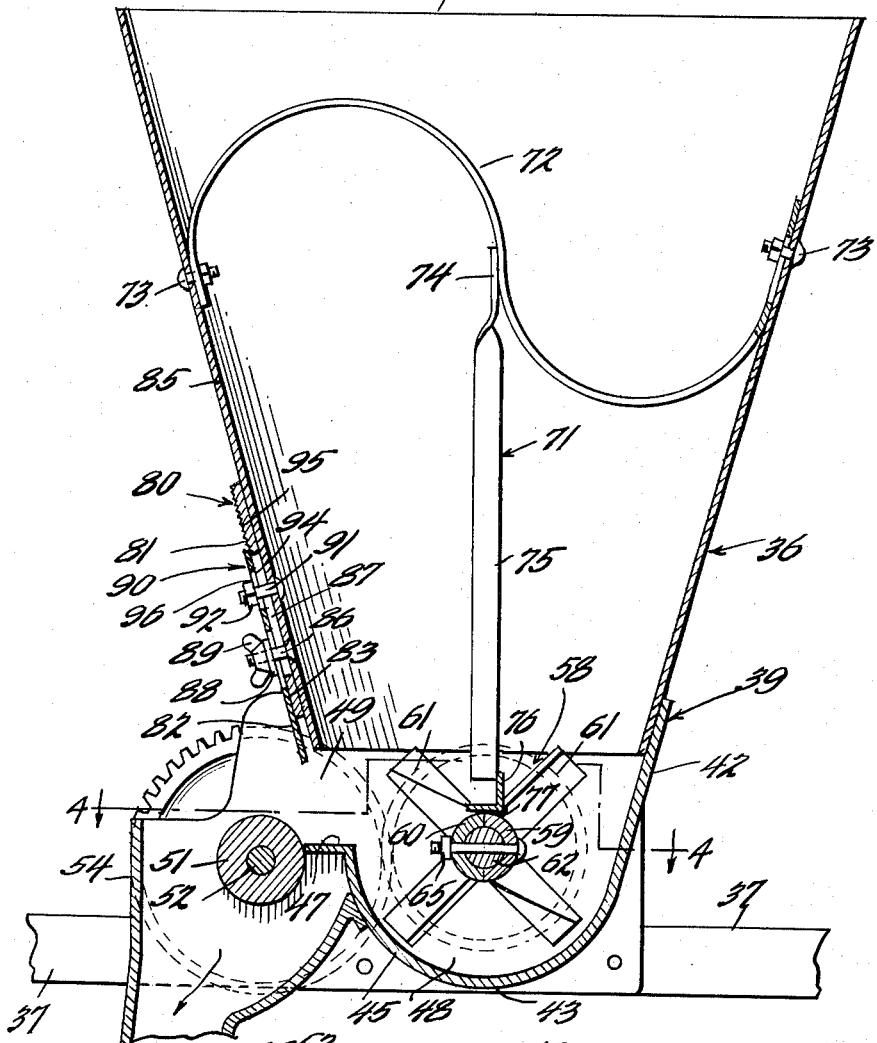
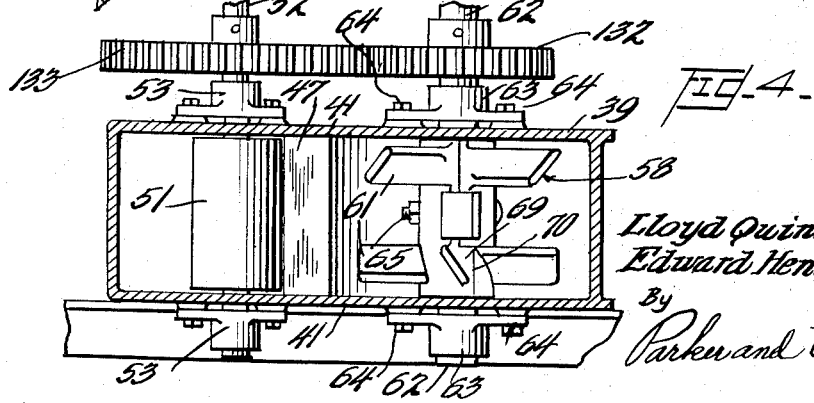
INVENTORS
Lloyd Quinby Hines, Sr.
Edward Henry Harris,
By
Parker and Walsh
ATTORNEYS March 12, 1957 L. Q. HINES, SR., ET AL 2,784,881
APPARATUS FOR DISTRIBUTING FERTILIZER, LIME AND LIKE MATERIALS
Filed May 1, 1953 4 Sheets-Sheet 4
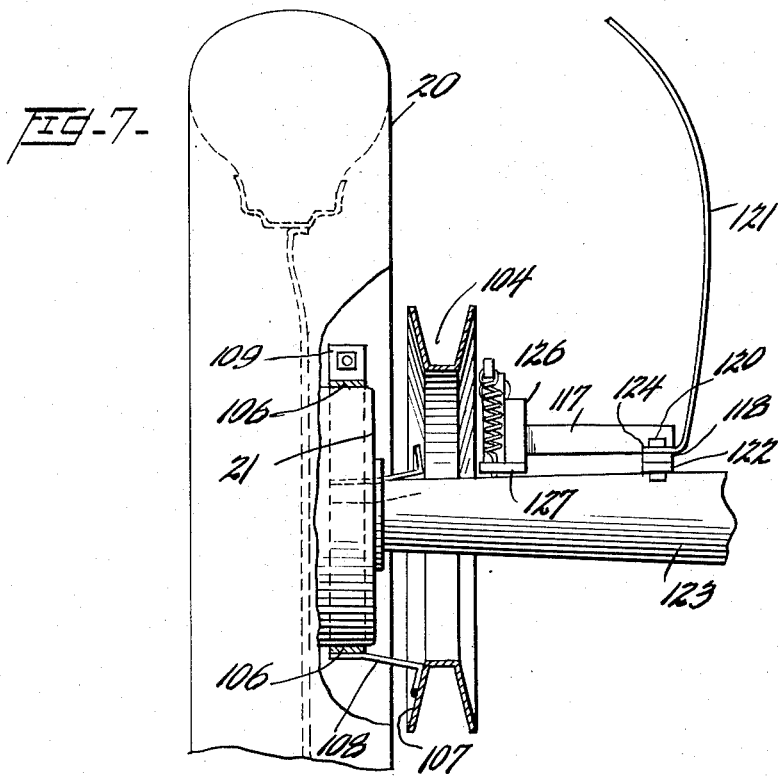
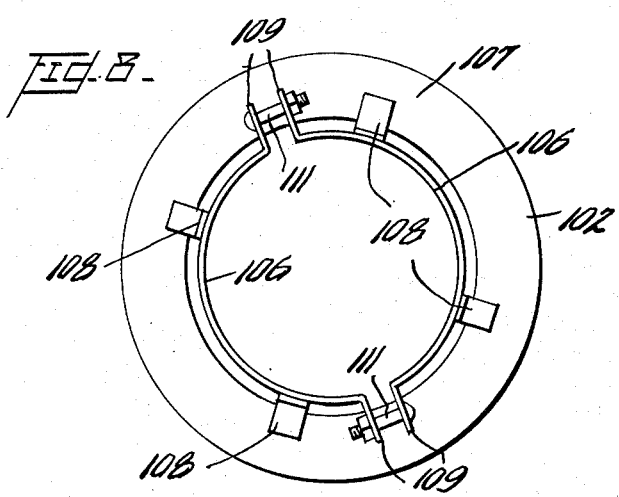
INVENTORS
Lloyd Quimby Hines, Sr.
Edward Henry Harris
BY Parker and Walsh
ATTORNEYS

United States Patent Office 2,784,881
Patented Mar. 12, 1957

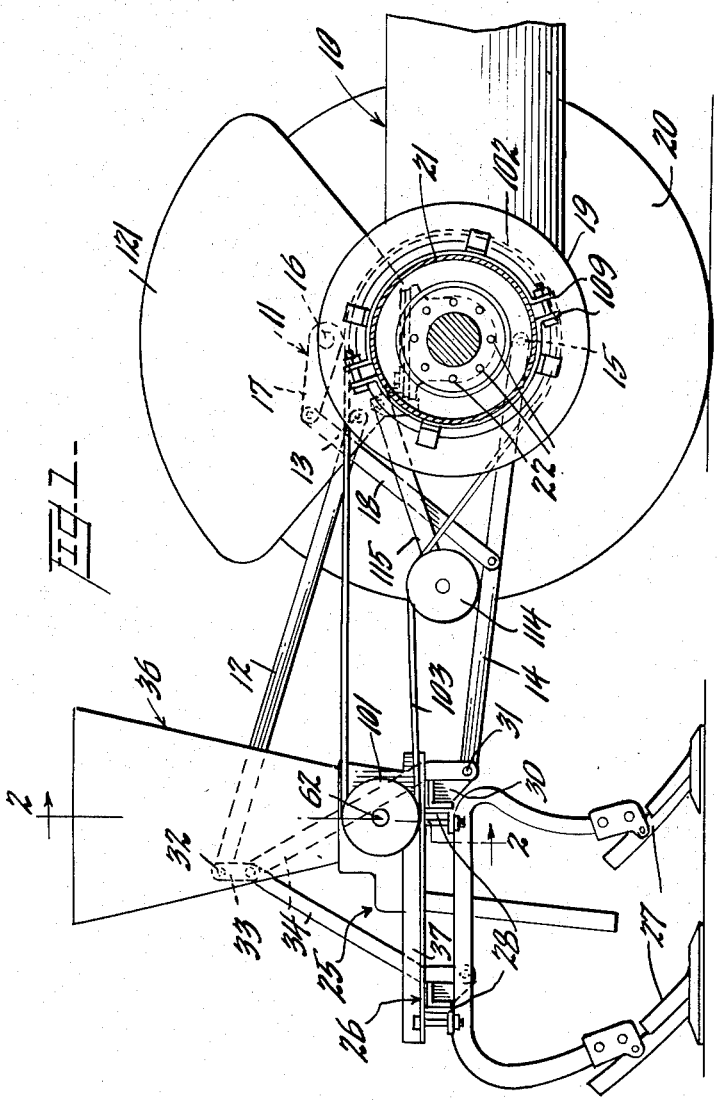

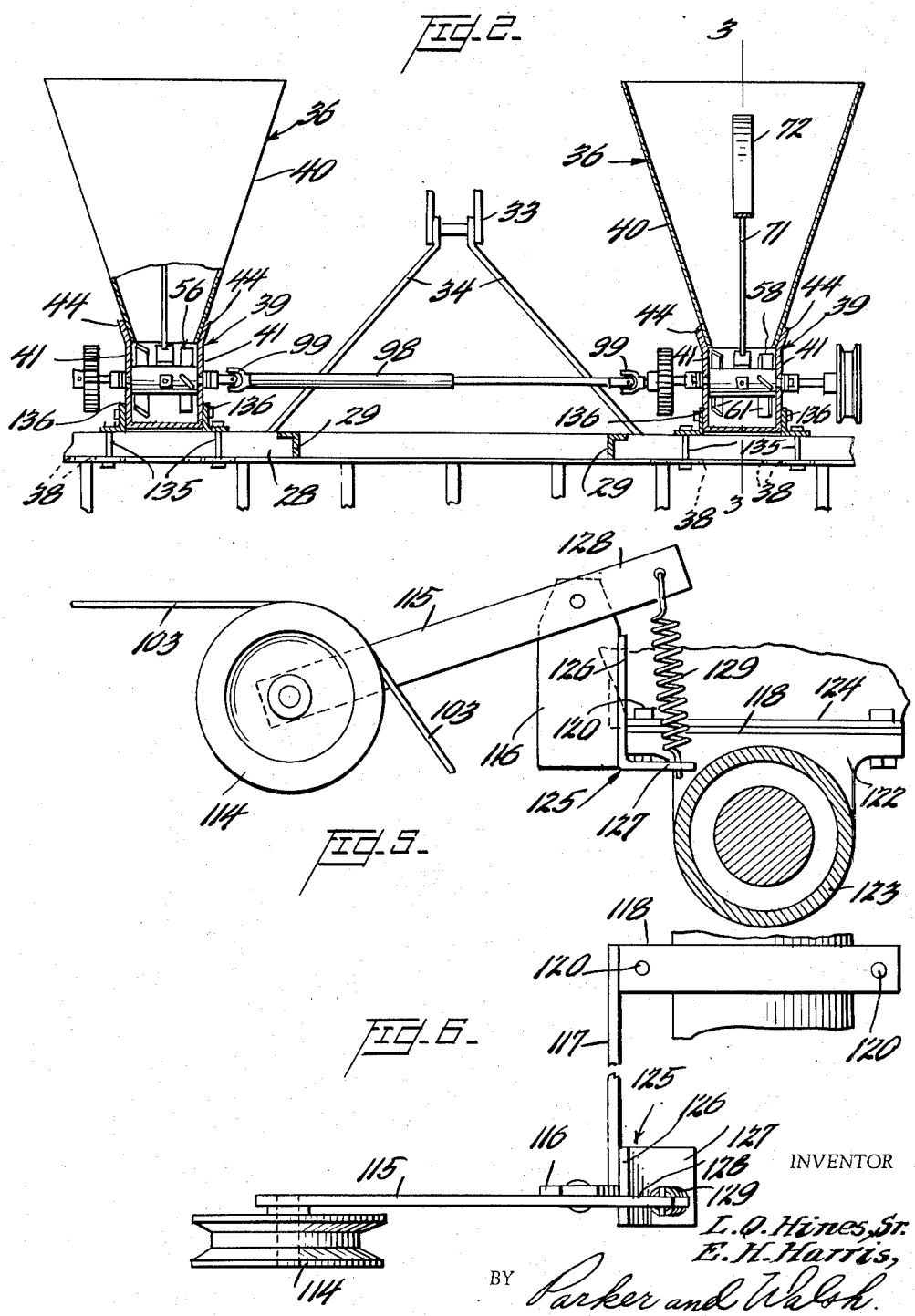

2,784,881

APPARATUS FOR DISTRIBUTING FERTILIZER, LIME AND LIKE MATERIALS

Lloyd Quinby Hines, Sr., and Edward Henry Harris, Suffolk, Va., assignors to The Ferguson Manufacturing Company, Inc., Suffolk, Va., a corporation of Virginia Application May 1, 1953, Serial No. 352,438

9 Claims. (Cl. 222—202)

This invention relates to apparatus for feeding and distributing fertilizer, lime and like materials and the present application is a continuation-in-part of the prior co-pending application of Lloyd Quinby Hines, Sr., and Edward Henry Harris, S. N. 281,312, filed April 9, 1952, now Patent No. 2,743,043, under the title "Apparatus for Distributing Fertilizer, Lime and Like Materials."

An important object of the invention is to simplify and improve the construction and operation of apparatus for distributing fertilizer, lime and like materials.

Another and more specific object of the invention is the provision of apparatus of the indicated type designed to be operatively associated with a tractor drawn farming implement, such as a cultivator, whereby the soil may be simultaneously worked and fertilized.

Another object of the invention is the provision of a tractor supported and tractor drawn farm implement, including fertilizer distributing mechanism, adapted to be operatively connected to the tractor for operation thereby.

A further object of the invention is the provision of a tractor drawn farm implement embodying ground working elements and fertilizer distributing mechanism wherein means are provided for operating the fertilizer distributing mechanism from a rotatable element on the tractor, such means being rendered inoperative when the apparatus is lifted from the ground.

A further object of the invention is the provision of tractor drawn tilling and fertilizing apparatus comprising ground working elements, fertilizer distributing mechanism driven from the tractor, and means operatively associated with the tractor, for lifting the apparatus from the ground and for simultaneously rendering the fertilizer distributing mechanism inoperative.

Another object of the invention is the provision of apparatus of the indicated type which will uniformly and continuously discharge material, such as fertilizer, lime and the like, while in motion, but which will not discharge material when the apparatus is stopped.

A further object of the invention is the provision of apparatus of the indicated type embodying improved means for feeding and discharging material and for distributing same on the ground.

Still another object of the invention is the provision of a distributor for fertilizer and like materials embodying a novel type of agitating and feeding rotor having axially spaced blades thereon constructed and arranged to throw the fertilizer or like material from both sides to the center, thereby causing the fertilizer to have greater force than when moved by blades or paddles which just lift it up.

A further object of the invention is the provision of a fertilizer distributor employing a novel type of two-piece agitating and feeding member which can be easily and quickly clamped on the shaft of the device with one bolt, and which at the same time will impart a spiral movement to the fertilizer as it passes through the discharge opening of the device.

Still another object of the invention is the provision of novel and improved means for controlling the discharge of fertilizer.

These and other objects and advantages of the invention will become more apparent during the course of the following description when taken in connection with the accompanying drawings wherein:

Figure 1 is a side elevational view of the apparatus operatively connected to a tractor.

Figure 2 is a vertical transverse cross-sectional view taken on the line 2—2 of Figure 1.

Figure 3 is an enlarged vertical cross-sectional view of the apparatus taken on the line 3—3 of Figure 2.

Figure 4 is a horizontal cross-sectional view of the apparatus taken on the line 4—4 of Figure 3.

Figure 5 is an enlarged elevational view, partly in section, of a portion of the apparatus.

Figure 6 is a plan view of a portion of the apparatus shown in Figure 5.

Figure 7 is a detail elevational view, partly in section, of a portion of the apparatus.

Figure 8 is a side elevational view of a portion of the apparatus shown in Figure 7.

Referring to the drawing, and particularly to Figure 1, the numeral 10 generally designates the rear portion of a tractor of conventional type, having a power-driven lifting mechanism 11. This lifting mechanism comprises an upper arm 12, pivotally connected to the tractor as at 13, and a pair of lower arms 14, pivotally connected to the tractor as at 15. A power driven shaft 16 is mounted on the tractor and carries arms 17 connected to intermediate portions of the lower arms 14 by links 18. At the ends thereof, opposite their pivotal connections with the tractor, the arms 12 and 14 are adapted to be connected to portions of the apparatus of the invention in a manner hereinafter described. When so connected it will be apparent that when the shaft 16 is turned in a clockwise direction, it will swing the arms 17 upwardly to raise such apparatus through the connecting links 18 and arms 14.

The rear of the tractor has mounted thereon the usual large driving wheels 19, equipped with pneumatic tires 20. The driving wheels 19 are removably secured to brake drums 21 by conventional stud bolts 22.

The fertilizing and tilling apparatus, herein generally designated by the numeral 25, comprises a main frame 26 from which a plurality of adjustable ground engaging elements 27 depend. The frame 26 may desirably consist of horizontally spaced L-shaped angle irons 28 connected together by suitable cross-braces 29 to form a unitary structure.

The frame 26 is adapted to be connected to the lower arms 14 of the tractor lifting mechanism 11 by brackets 30 secured to the forward longitudinal frame member 28. The arms 14 are pivotally connected to the brackets 30 by pivot pins 31. The upper arm 12 of the tractor lifting mechanism is pivotally secured, as at 32, to a member 33, carried by arms 34 secured to the longitudinal frame members 28. By virtue of these connections to the lifting mechanism of the tractor, the frame 26 may be lifted to disengage the elements 27 from the ground with a substantially parallel movement of the frame.

Mounted on the frame 26 are identical material feeding and distributing devices 36 which are spaced apart to distribute fertilizer or like material on opposite sides of adjacent ground rows or furrows. These devices are bolted to the upstanding flanges of angle irons 37, which latter in turn are bolted to the frame members 28. Additional openings 38 are provided in the frame members 28 for adjustably positioning the angle irons 37 to correspond to the distance between adjacent rows or furrows.

The detail structure of the devices 36 is shown most clearly in Figures 3, 4 and 5. As there shown, each of these devices comprises a lower cast iron base portion 39 and an upper sheet metal portion 40. The cast iron base portion 39 may desirably be formed with substantially vertical side wall portions 41, a downwardly and rearwardly inclined front wall portion 42, and a concavely curved bottom wall portion 43. Outwardly flaring flanges 44 extend upwardly from the top edges of the side and front wall portions 41 and 42 for receiving the correspondingly shaped lower edge portions of the sheet metal member 40 to which they are secured in any suitable manner, as by bolts.

The concavely curved bottom wall portion 43 curves rearwardly and upwardly from its lowest point, as shown at 45, and terminates in a rearwardly extending, substantially horizontally disposed lip 47. The curved configuration of the bottom wall provides a relatively shallow pocket 48 at the bottom of the hopper from which material may readily be thrown onto the lip or shelf 47 in a manner hereinafter described. In a preferred arrangement, the lip 47 is approximately ¾ inch in width and extends transversely of the device between the side walls 41, forming therewith, and with the rear lower edge of the sheet metal portion 40, a rear discharge opening 49.

In the apparatus illustrated and described in our copending application, hereinabove referred to, the lip 47 was relatively wide and the material was discharged over the rear edge thereof when sufficient pressure had been built up by the rotors to be described. In accordance with the present invention, the lip 47 is not as wide, and discharge of the material is effected by a roller 51, mounted on a shaft 52, rotatably journaled in suitable bearing members 53 associated with the side wall portions 41 of the base 39. The roller 51 is approximately 1¾" in diameter and preferably, but not necessarily, has its axis disposed slightly below a horizontal plane coincident with the top surface of the lip 47. During operation of the apparatus, the roller 51 is rotated in a manner hereinafter described.

A discharge spout 54 is mounted below the roller 51 and extends downwardly and rearwardly to receive material discharged therefrom. The discharge spout 54 is preferably formed with laterally spaced discharge portions (not shown), to which rubber hoses may be secured, for distributing material on both sides of a row or furrow.

Material is fed from the base portion 39 of the device onto the lip or shelf 47 by an agitating and feeding rotor or impeller 58. In a preferred construction, the rotor 58 consists of two complemental half sections made up of split sleeve portions 59 and 60 and blades 61. The sections 59 and 60 are shaped to snugly engage and encircle a shaft 62 rotatably journaled in bearings 63 secured to the side walls 41 by bolts or screws 64. The sections 59 and 60 are secured in assembled relation with the shaft 62 by a single bolt 65.

To facilitate proper alignment and assembly of the complemental half sections of the rotor, and further to provide for proper spacing of the blades 61, the sleeve section 60 is provided, adjacent one end thereof, with a projection 69. This projection fits into a correspondingly shaped recess 70 in the sleeve section 59 thereby serving to axially align and properly position the two sections with respect to each other. It will be noted, in this connection, that one of the blades 61 is mounted in part on the projection 69.

As shown in Figure 4, the blades 61 are preferably arranged in two series, spaced apart axially of the rotor, the four blades of each series, as illustrated, extending radially outward from their respective sleeve portions at right angles to each other, and the blades of one series being circumferentially offset or displaced approximately 45 degrees with respect to the blades of the other series. The blades 61 may desirably be substantially flat in shape.

To increase the effectiveness of the blades 61 for moving material from the base portion of the hopper to the lip or shelf 47, the same are arranged so that the flat faces thereof are inclined at an angle of approximately 45 degrees, more or less, to their direction of rotation, the blades of the two series being oppositely inclined in a manner such as to throw material inwardly toward the space between the two series of blades. As a result of this construction, the two series of blades throw the material in converging substantially spiral paths causing it to have greater force than it would otherwise have if the blades were disposed substantially at right angles to their direction of movement.

Material is fed to the base portion 39 from the sheet metal portion 40, the walls of which flare outwardly in an upward direction. To insure proper feeding of material from the sheet metal hopper portion 40, a vibrating device 71 is provided. The device 71 comprises a substantially S-shaped member 72, vertically positioned in the sheet metal hopper portion 39 and having its ends secured to the front and rear walls thereof by bolts 73. The central portion 74 of the member 72 is preferably substantially vertically disposed and has secured thereto a vibrating member 75 which extends downwardly therefrom for engagement by one flange 76 of an angle iron 77 secured to one of the sleeve portions 59 or 60 of the rotor 58. It will be apparent that as the rotor revolves, the outwardly extending flange 76 of the angle iron 77 will strike the lower end of the vibrating member 75 once during each revolution of the rotor. The members 72 and 75 are formed of a suitable resilient material, such as spring steel or the like, so that when the end of the member 75 is struck by the angle iron 76 a vibration will be set up in these members which will be transmitted to the walls of the sheet metal member 40. To increase the effectiveness of such vibration the lower end of the vibrating member 75 is preferably turned through an angle of 90 degrees with respect to the portion secured to the member 72, so that an edge, rather than a side, will be struck by the angle iron 76.

Movement of material from the hopper through the discharge opening 49 is controlled by an adjustable feed regulating gate or member 80. The member 80 may desirably comprise an upper portion 81, formed of wood or similar material, and a lower portion 82, formed of sheet metal or the like, and secured in a groove 83 of the portion 81 by bolts or the like. The member 80 is secured to the rear wall 85 of the sheet metal hopper portion 40 and is vertically adjustable thereon to project the portion 82 across varying portions of the discharge opening 49. The portion 82, of course, is of sufficient width to substantially completely span the opening 49 between the side wall portions 41.

The gate member 80 is held in adjusted position on the wall 85 by a locking device comprising a bolt 86 mounted in an opening in the wall 85, and extending through a slot 87 extending longitudinally of the wood portion 81. A washer 88 is urged into frictional engagement with the outer face of the gate member 80 by a wing nut 89. A U-shaped metal bracket 90 slidably receives the gate member 80 and serves as a guide for same. A bolt 91 and nut 92 secure to the rear wall 85 of the hopper with the ends of the legs in engagement with the hopper wall. The legs of the U-shaped bracket 80 are slightly longer than the thickness of the gate member 80 so that when the bracket is secured in position by tightening the nut 92, there will be a slight clearance between the connecting portion 94 of the bracket and the outer surface of the gate member to permit sliding movement of the latter through the bracket.

The bracket 90 also serves to indicate the adjusted position of the gate member 80 with respect to the lip or shelf 47. For this purpose, the outer rear surface of the gate member is provided with a series of uniformly spaced graduations 95 which may take any suitable form, as for example, lines or grooves. The upper one of the graduations 95 is designed to be aligned with the upper edge of the bracket 90 when the lower edge of the gate member rests on the shelf or lip 47. This is the zero or closed position of the gate member and in order to allow for some variation in manufacture the bracket 90 is made adjustable by the provision of an elongated slot 96 therein through which the bolt 91 extends.

Where the material feeding and distributing devices are used in pairs, as illustrated herein, the rotor shafts 62 are connected together by a telescopic type of shaft 98. The shaft 98 may desirably be connected to the shafts 62 by universal joints 99.

Rotation is imparted to the shafts 62 by a belt and pulley drive best shown in Figures 1 and 5-8 and comprising a pulley 101 mounted on the shaft 62 of one of the brake drums of the tractor, and a belt 103 trained over these pulleys. The pulley 102 is particularly designed for use herein and has a relatively deep V-groove 104 therein so that the belt 103 will not become disengaged therefrom during lateral movement of the frame 26. The pulley 102 is adapted to be removably secured on the brake drum 21 of the tractor by a pair of semi-circular shaped members 106 secured to one face 107 of the pulley by circumferentially spaced arms 108. The ends of the semi-circular members 106 are turned outwardly as at 109 and these outwardly turned end portions are normally disposed in spaced apart relation as shown. Openings are provided in the portions 109 for receiving bolts 111 to draw the portions together for a purpose to be described.

Means are provided for tensioning the belt 103, such means being operative when the frame 26 is in its lower position with the ground engaging elements 27 in engagement with the ground, and being rendered inoperative to permit the belt to slip, when the frame 26 is raised to its uppermost position. In a preferred arrangement, such means comprise a pulley 114 rotatably journaled on an arm 115 pivotally mounted on a supporting plate 116 carried at one end of a bracket 117. At its opposite end, the bracket 117 has a lateral extension 118 provided with openings therein for receiving the bolts 120 which normally hold the usual fender 121 of the tractor in position. As shown more clearly in Figures 5 and 7, the lateral extension 118 rests on a bearing support 122 carried by the axle housing 123 and is adapted to be clamped between the bearing support and the flange 124 of the fender 121.

Opposite the supporting plate 116 the bracket 117 has secured thereto a member 125, preferably comprising a short section of angle iron having a vertical flange 126 and a horizontal flange 127. The vertical flange 126 extends outwardly from the bracket 117 beneath an extension 128 of the arm 115 and serves as a stop to limit downward swinging movement thereof and upward swinging movement of the pulley 114 thereby. A spring 129 is connected between the extension 128 and flange 127 and resiliently urges the pulley 114 into engagement with the belt 103.

Referring now to Figure 4, the roller 51 of each of the material feeding and distributing devices 36 is driven by spur gears 132 and 133 mounted respectively on the rotor shaft 62 and the roller shaft 52. The gear 132 is approximately one-half the size of the gear 133 so that the roller 51 will rotate at about half the speed of the rotor 58.

Operation

When it is desired to utilize the apparatus of the invention the right rear wheel 20 of the tractor and the fender bolts 120 are first removed to permit mounting of the bracket 117 and pulley 102. The lateral extension 118 of the bracket 117 is then positioned on the bearing support 122 under the flange 124 of the fender and bolts 120 replaced to secure the bracket in position. Following this, the pulley 102 is secured in position on the brake drum 21 by sliding the semi-circular portions 106 thereon and then tightening the bolts 111 to cause them to tightly grip the drum. The belt 103 is then placed on the pulley following which the rear wheel of the tractor is replaced.

The upper and lower arms 12 and 14 of the tractor lifting mechanism are then connected to the apparatus at the pivot points 31 and 32 following which the material distributing devices 36 are adjusted on the frame to correspond to the distance between adjacent rows of furrows which it is desired to fertilize. This is very simply accomplished by removing the bolts 135 which secure the angle iron supporting members 136 to the frame members 28, moving the angle iron supporting members to the desired positions and reinserting the bolts. Following this, the belt 103 is trained over the idler pulley 114 and the driven pulley 101, and the gate members 80 adjusted for the desired discharge of material.

In the initial adjustment of each gate member 80, the wing nut 89 is loosened and the gate member moved downwardly until the lower edge thereof rests on the shelf 47. The nut securing the U-shaped bracket 90 in place is then loosened, the bracket adjusted until the upper edge thereof lies opposite the upper graduation 95 on the gate member, and the nut then tightened to hold the bracket in place. The gate member is then moved upwardly to the desired position and clamped in place by tightening the wing nut. When so adjusted, the discharge opening of each distributing device will be the same size so that equal amounts of material will be discharged from each distributing device.

When the indicated adjustments have been completed the hoppers of the distributing devices are filled with fertilizer or the like and pulled over the ground, to be tilled and fertilized, by the tractor. During such movement the large pulley 102 rotates with the brake drum 21, and through the connections previously described, rotates the shafts 62 and the rotors 58 carried thereby. The shafts 62, in turn, rotate the rollers 51 through the spur gears 132 and 133, the rollers 51 of course, rotating in a direction opposite to the rotors 58, and at approximately half the speed. As the rotors 58 rotate, the blades 61 thereof throw the material in the curved bottom of the device upwardly and rearwardly in converging spiral paths onto the lip or apron 47. As the material piles up on the lip 47 it is engaged by the roller 51 which moves it rearwardly thereover for discharge into the spout 54. As long as the rotors 58 and rollers 51 are rotating, material is continuously and uniformly discharged from the device through the discharge spout and onto the ground. However, as soon as rotation of the rotors and rollers is stopped, the discharge of material is likewise stopped and the rollers 51 act as gates to prevent further discharge of material.

In the arrangement herein shown and described, the rotors 58 and rollers 51 cease to rotate whenever the tractor is stopped or whenever the distributing apparatus is lifted from the ground, thereby providing an automatic control for the discharge of material under all conditions of operation and use. In the first case this is merely the result of stopping the large driving pulley 102. In the second case, it is the result of a slack produced in the driving belt 103. Thus, during the initial stages of lifting of the apparatus the idler pulley 114 will move upwardly with the belt under the influence of the spring 129. However, as the lifting movement proceeds, the extension 128 of the arm 115 contracts the flange 126 of the member 125 to prevent further upward movement of the idler pulley. The tension on the belt 103 provided by the idle pulley is thereupon relieved and the belt slackens to a point where it slips on the pulley 102 and is no longer driven thereby. It will thus be apparent, that when the apparatus is raised to inoperative position the rotors 58 and rollers 51 cease to rotate so that the discharge of material is automatically cut off.

During operation of the apparatus limited lateral movement of the frame 26 may occur and this would normally tend to cause the large driving pulley 102 to throw the belt 103. However, by virtue of the enlarged groove 104 in this pulley such tendency is prevented and there is no possibility of this in actual practice.

It is worthy of note that the opening 49 is relatively large and in fact, in actual practice, would usually be approximately 4" across. By virtue of this and the arrangement of the shelf 47 and roller 51 it is possible to open the gate member 80 to a point where lint, trash and the like will pass through without clogging the opening.

It will thus be seen that the present invention provides improved apparatus for distributing fertilizer and like materials uniformly on the ground and for simultaneously tilling the soil. While a preferred embodiment of the invention has been illustrated and described, it is not intended that the invention be limited to the specific details thereof except as included in the following claims.

We claim:

1. Apparatus for distributing fertilizer and the like comprising a hopper having downwardly converging side and end walls and a concavely curved bottom wall, said bottom wall having an upwardly curving rear end portion terminating in a rearwardly extending substantially horizontally disposed shelf having a rear edge, said hopper having an opening therein extending upwardly from said shelf, agitating and feeding means rotatably mounted in said hopper for feeding material onto said shelf, and a horizontally disposed roller rotatably mounted adjacent the rear edge of said shelf and projecting thereabove for controlling the discharge of material therefrom.

2. Apparatus of the type set forth in claim 1 including a feed regulating member secured to said hopper and adjustably positionable thereon to partially close said opening and thereby control the feed of fertilizer onto said shelf.

3. Apparatus of the type set forth in claim 1 including a driving connection between said agitating and feeding means and said roller whereby the latter is rotated at a speed proportional to the speed of the former.

4. Apparatus for distributing fertilizer and like materials comprising a hopper having a concavely curved bottom, said hopper having a rear discharge opening therein spaced above and rearwardly of said concavely curved bottom, a substantially horizontally disposed shelf extending rearwardly from the lower edge of said opening and having a rear edge, and a horizontally disposed roller rotatably mounted adjacent the rear edge of said shelf and projecting thereabove for controlling the discharge of material therefrom.

5. Apparatus for distributing fertilizer and like materials comprising a hopper having a curved bottom and an elongated substantially horizontally disposed discharge opening offset rearwardly and upwardly with respect to the lowest portion of said bottom, a substantially horizontally disposed shelf extending rearwardly from the lower edge of said opening and forming a continuation of said curved bottom, a rotor rotatably mounted in said hopper and having outwardly extending blades thereon adapted to sweep across said curved bottom and upwardly past said shelf to feed material thereon, a horizontally disposed roller rotatably mounted adjacent an edge of said shelf projecting thereabove for controlling the discharge of material therefrom, and a feed regulating member movable across said opening to control the feed of material onto said shelf.

6. Apparatus for feeding materials comprising a receptacle having a concavely curved bottom and a rear discharge opening offset rearwardly and upwardly with respect to the lowest portion of said bottom, a substantially horizontally disposed shelf extending rearwardly from the lower edge of said opening and having an upper horizontally disposed surface and a rear edge, means for feeding material onto said shelf comprising a rotor rotatably mounted in said receptacle, and a horizontally disposed roller rotatably mounted adjacent the rear edge of said shelf and projecting thereabove for controlling the discharge of material therefrom.

7. Apparatus of the type set forth in claim 6 wherein said rotor has a plurality of outwardly extending blades thereon, said blades being arranged in a plurality of axially spaced series, each blade of at least one series having its face angularly inclined with respect to the direction of rotation of such blade in a manner such that it imparts an axial as well as a circumferential component of movement to the material and in a direction toward an adjacent series of blades.

8. Apparatus of the type set forth in claim 6 wherein said rotor comprises a shaft, a split sleeve encircling said shaft, means releasably securing said split sleeve in assembled relation with said shaft for rotation therewith, and a plurality of blades mounted on each portion of said split sleeve and operable to feed material from said receptacle toward the discharge opening therein.

9. Apparatus for distributing fertilizer and like materials comprising a hopper having a curved bottom and an elongated substantially horizontally extending discharge opening offset rearwardly and upwardly with respect to the lowest portion of said bottom, a substantially horizontally disposed shelf extending rearwardly from the lower edge of said opening and forming a continuation of said curved bottom, a rotor rotatably mounted in said hopper and having outwardly extending blades thereon adapted to sweep across said curved bottom and upwardly past said shelf to feed material thereto, said blades being arranged in a plurality of axially spaced series, the blades of each series being axially inclined with respect to their direction of rotation in a manner such as to throw material rearwardly and outwardly in converging spiral paths, and a horizontally disposed roller rotatably mounted adjacent the rear edge of said shelf and projecting thereabove for controlling the discharge of material therefrom.

References Cited in the file of this patent

UNITED STATES PATENTS

| | | |
|---|---|---|
| 54,126 | De Camp | Apr. 24, 1866 |
| 184,516 | Flatau | Nov. 21, 1876 |
| 197,953 | Trayser | Dec. 11, 1877 |
| 208,599 | Hildrup et al. | Oct. 1, 1878 |
| 215,387 | Nauman et al. | May 13, 1879 |
| 294,418 | Wegmann | Mar. 4, 1884 |
| 663,902 | Hutchison | Dec. 18, 1900 |
| 944,396 | Wilson | Dec. 28, 1909 |
| 1,033,907 | Kinney | July 30, 1912 |
| 2,245,152 | Masters | June 10, 1941 |
| 2,317,643 | Rogers | Apr. 27, 1943 |
| 2,328,174 | Silver | Aug. 31, 1943 |
| 2,350,880 | Dellinger | June 6, 1944 |
| 2,410,937 | Harder | Nov. 12, 1946 |
| 2,547,867 | Judson | Apr. 3, 1951 |
| 2,593,516 | Alley et al. | Apr. 22, 1952 |
| 2,633,789 | Ober | Apr. 7, 1953 |
| 2,656,801 | Hansen et al. | Oct. 27, 1953 |
| 2,659,447 | Wetmore | Nov. 17, 1953 |